(12) United States Patent
Bates, III

(10) Patent No.: US 6,315,205 B1
(45) Date of Patent: Nov. 13, 2001

(54) ADAPTOR FOR SMART CARD

(75) Inventor: Charles Linsday Bates, III, Laguna Hills, CA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 09/347,569

(22) Filed: Jul. 6, 1999

(51) Int. Cl.[7] ................................... G06K 13/04
(52) U.S. Cl. .................. 235/479; 235/441; 235/453; 361/737
(58) Field of Search ................... 235/479, 482, 235/483, 485, 441, 453, 492; 361/684, 737

(56) References Cited

U.S. PATENT DOCUMENTS

| 4,835,375 | 5/1989 | Shimamura et al. | 235/479 |
| 5,375,037 | 12/1994 | Le Roux | 361/684 |
| 5,473,505 | 12/1995 | Kessoku et al. | 361/684 |
| 5,563,400 | 10/1996 | Le Roux | 235/486 |
| 5,625,534 | 4/1997 | Okaya et al. | 361/686 |
| 5,679,007 | 10/1997 | Potdevin et al. | 439/76.1 |
| 5,739,515 | 4/1998 | Takemura | 235/441 |
| 5,752,857 | 5/1998 | Knights | 439/638 |

FOREIGN PATENT DOCUMENTS

| 43 10517 C2 | 10/1994 | (DE) . |
| 196 04 031 A1 | 2/1996 | (DE) . |
| 196 29 351 A1 | 7/1996 | (DE) . |
| 0 803 833 A2 | 4/1997 | (EP) . |
| 197 16 694 A1 | 4/1997 | (DE) . |
| WP96/42063 | 6/1996 | (WO) . |

Primary Examiner—Karl D. Frech
Assistant Examiner—Daniel St. Cyr
(74) Attorney, Agent, or Firm—Roger C. Turner

(57) ABSTRACT

An adaptor (10) can be inserted into a PC passage (12) of a computer device (14) and which can receive and connect to a smart card (30). The adaptor has top and bottom frame halves (60, 62) that form at least opposite side portions of a smart card-receiving slot (20) between them, with each frame half including a molded plastic body (90, 94) and a sheet metal cover part (90, 96) with tabs (100, 102) molded into the corresponding body. The two plastic bodies are ultrasonically welded together at opposite sides of their front ends (136, 138) which lie forward of the slot, and at opposite side parts (140, 142) of their rear projection ends. At least one of the plastic bodies forms side stops (232) at opposite sides of the front of the slot, to resist sideward movement of the front of the fully installed smart card, with each side stop lying immediately outside the rounded corner (220) at one side of the smart card.

12 Claims, 5 Drawing Sheets

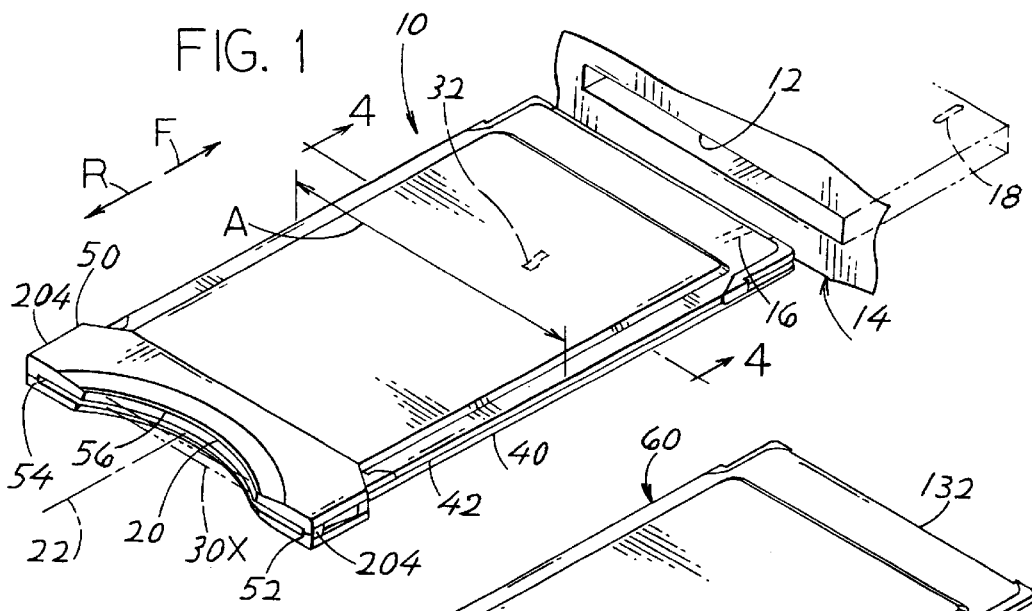
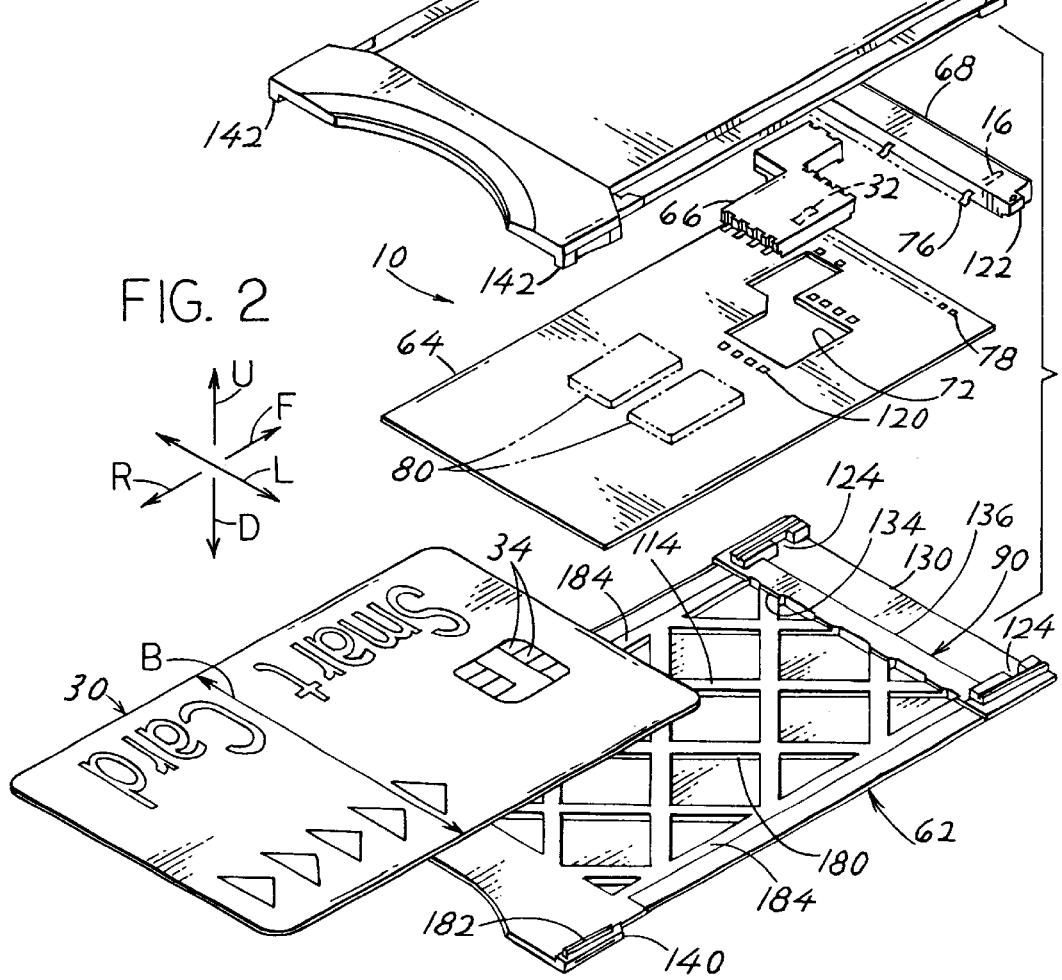

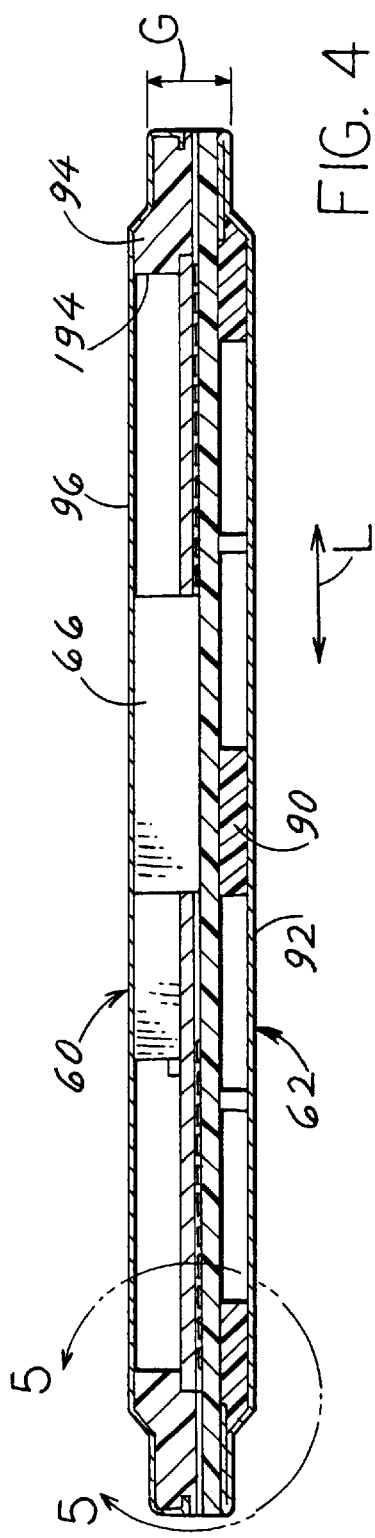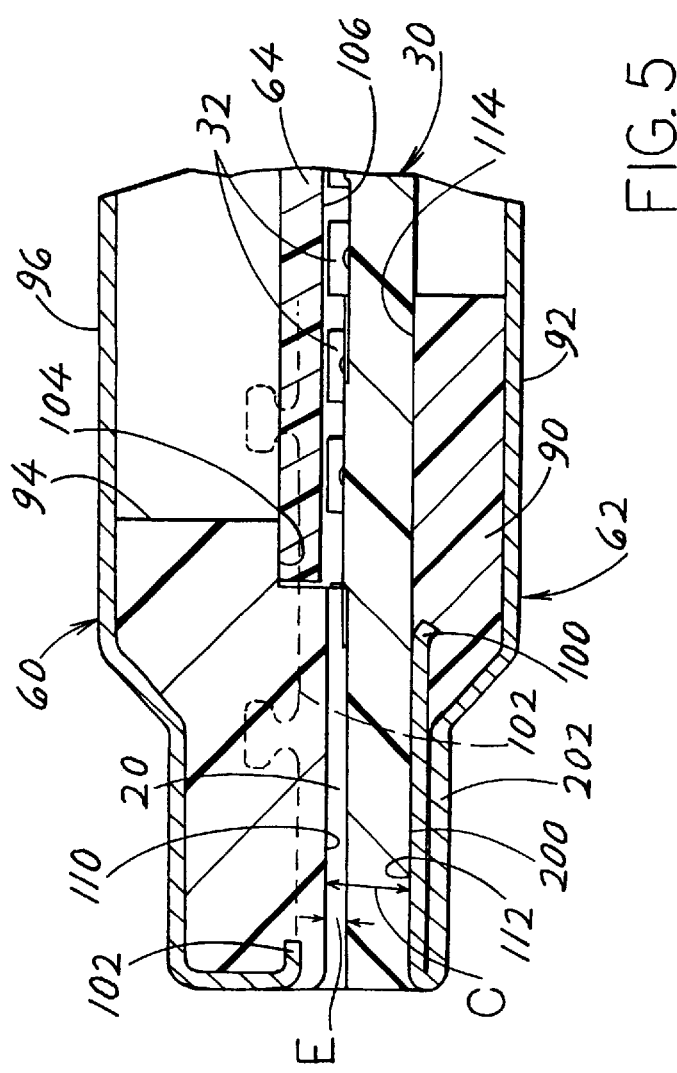

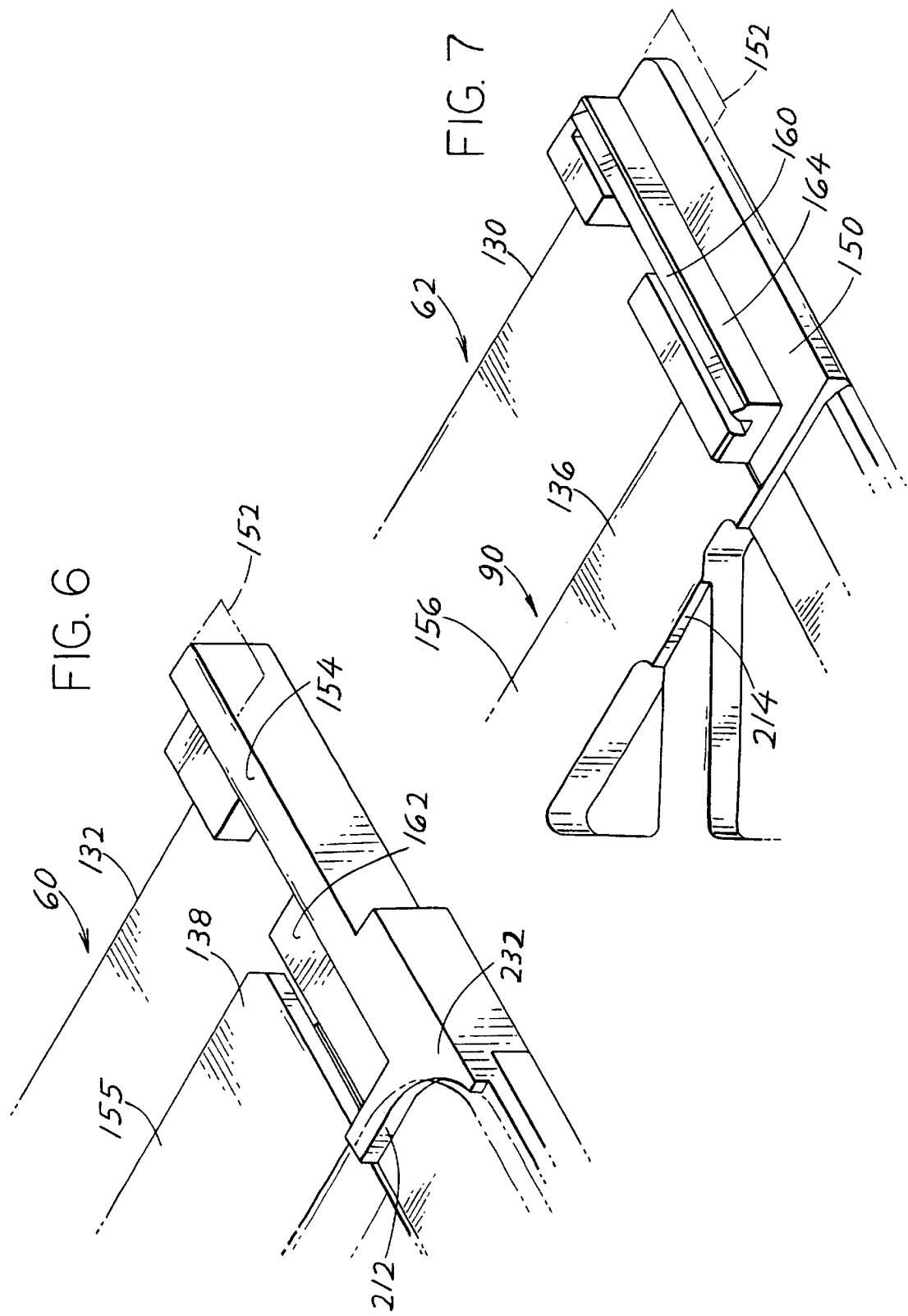

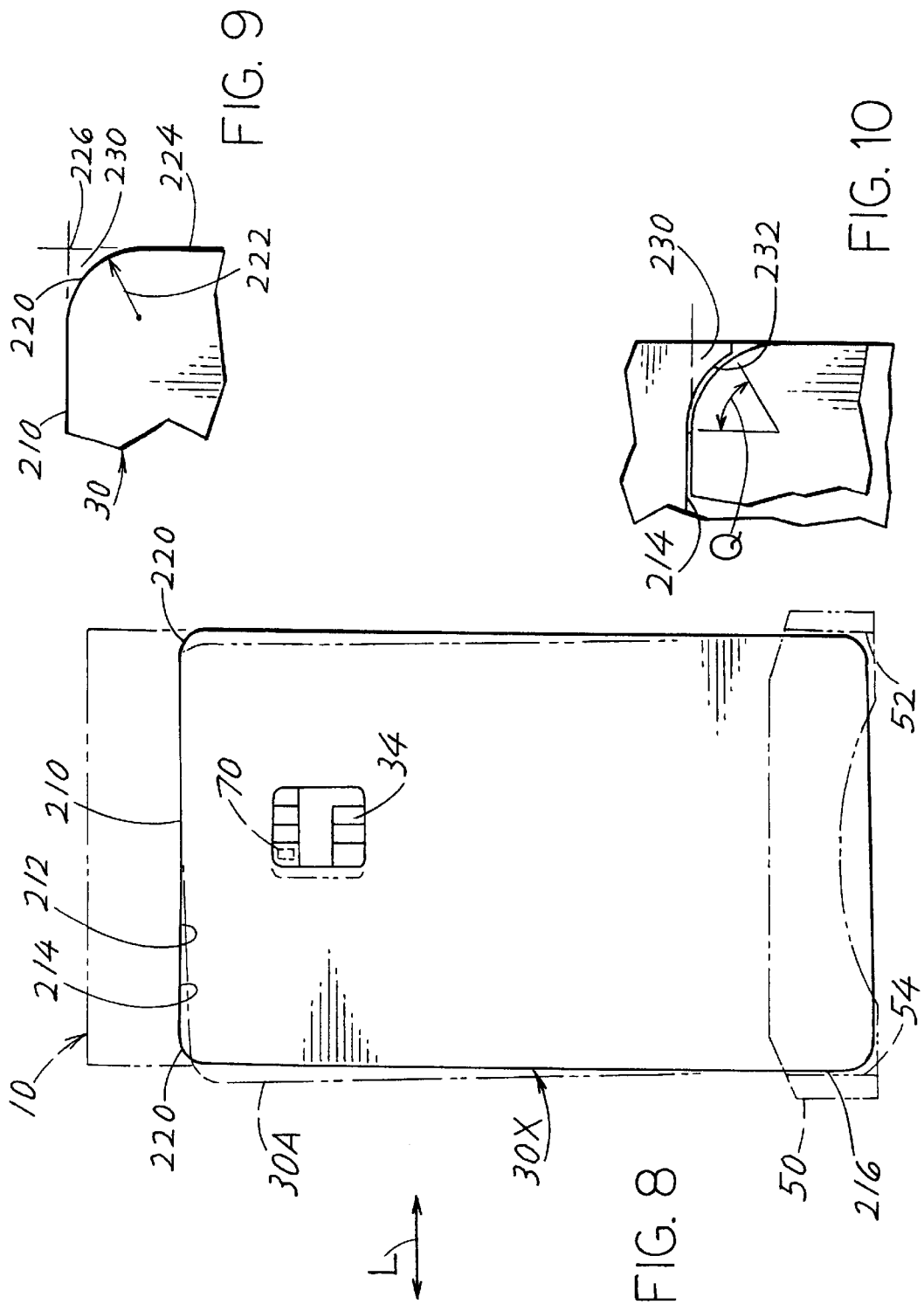

ADAPTOR FOR SMART CARD

BACKGROUND OF THE INVENTION

Computer devices such as laptop computers, are common provided with passages for receiving IC cards (often referred to as PC cards ) constructed in accordance with PCMCIA (Personal Computer Memory Card International Association). Standard Types I, II, and III cards have maximum thicknesses of 3.3 mm, 5 mm, and 10.5 mm, respectively, with the Type II card being the most popular. Each card has a connector at its front end with 68 contact positions. Another type of standard card, constructed under ISO7816 standards is the large smart card, which is the size of a credit card with a nominal thickness of 0.75 mm. The standard smart card has a width of 54 mm, which is the same as that for a standard IC card.

Although specialized electronic devices are available for directly writing/reading data into and out of smart cards, there is a need to perform these functions through contacts at the front ends of computer device passages that are designed to receive IC cards. Since smart cards are thinner than IC cards and have contacts on a face instead of at an end, a smart card cannot be read by inserting only the smart card into the passage of a computer device. Adaptors are available for receiving a smart card and for insertion into an IC card passage of a computer device, but they have to be specially designed because the width of 54 mm of the standard smart card is the same as the width of the standard IC card.

One approach to the construction of an adaptor is to provide an adaptor in the shape of an IC card, but with a rearward extension that is wider than 54 mm and which is intended to lie out of the card-receiving passage. Such an adaptor has been constructed using a frame formed of sheet metal with top and bottom halves joined only at their front end, and with a metal plate attached to the bottom half to form the lower surface of the slot that receives the card. An adaptor of this general shape, but which was more rigid, of better aesthetic appearance, and which avoided exposed sheet metal edges that could cut the person handling the adaptor, would be of value.

Because of the fact that the standard IC cards and smart cards have the same width, it previously has not been possible to have the adaptor control the horizontal position of the smart card, except at its rear end. The passage in the computer device that receives the IC card, commonly has a width of 56 mm, which allows the front end of the card to shift by 1 mm to either side. Some passages have an even greater width, which allows even more shifting of the front end of the smart card. Sufficient shifting of the front end can result in contacts of a connector of the adaptor, contacting the wrong contact pad of the smart card. A simple construction which avoided this, would be of value.

SUMMARY OF THE INVENTION

In accordance with one embodiment of the present invention, an adaptor is provided for holding a smart card within an IC card-receiving passage of a computer device, where the adaptor front portion and smart card are of the same maximum width, which provides an adaptor which is rigid and of good appearance, and which has a molded plastic handle part for pullout by the fingers of a user. The adaptor has top and bottom frame halves that each includes a molded plastic body that forms a wall of the slot that receives the smart card. The plastic bodies are ultrasonically welded together at opposite sides of their front ends, which lie forward of the slot, and at opposite sides of their rear extension. A sheet metal cover part lies around each plastic body, with entrapment parts in the form of tabs molded into the corresponding plastic body. The bottom plastic body is honeycombed, while the upper plastic body forms only side beams along most of the slot length.

The front end of the fully installed card is prevented from moving sidewardly, by side stops formed on the frame. The leading edge of the card has rounded corners, and each side stop lies in the unoccupied region between the actual rounded corner and an imaginary sharp corner.

The novel features of the invention are set forth with particularity in the appended claims. The invention will be best understood from the following description when read in conjunction with the accompanying drawings.

BRIEF DESCRIPTION OF THE DRAWINGS

FIG. 1 is a rear and top isometric view of an adaptor constructed in accordance with the present invention.

FIG. 2 is an exploded rear and top isometric view of the adaptor of FIG. 1.

FIG. 4 is a sectional view taken on line 4—4 of FIG. 1.

FIG. 5 is an enlarged view of the area 5—5 of FIG. 4.

FIG. 6 is an enlarged isometric view of a portion of the top frame half of FIG. 3, but which has been modified to form a side stop, and also showing, in phantom lines, a portion of the smart card.

FIG. 7 is an enlarged isometric view of the front part of the bottom frame half of FIG. 2.

FIG. 8 is a plan view of the smart card of FIG. 2, and showing, in phantom lines, the shape of the adaptor and the position of the smart card when its front end is shifted to one side.

FIG. 9 is an enlarged view of a front corner of the smart card of FIG. 8.

FIG. 10 is an enlarged plan view of the smart card of FIG. 8, and also showing the sidestop of FIG. 6.

DESCRIPTION OF THE PREFERRED EMBODIMENTS

Figure 3:
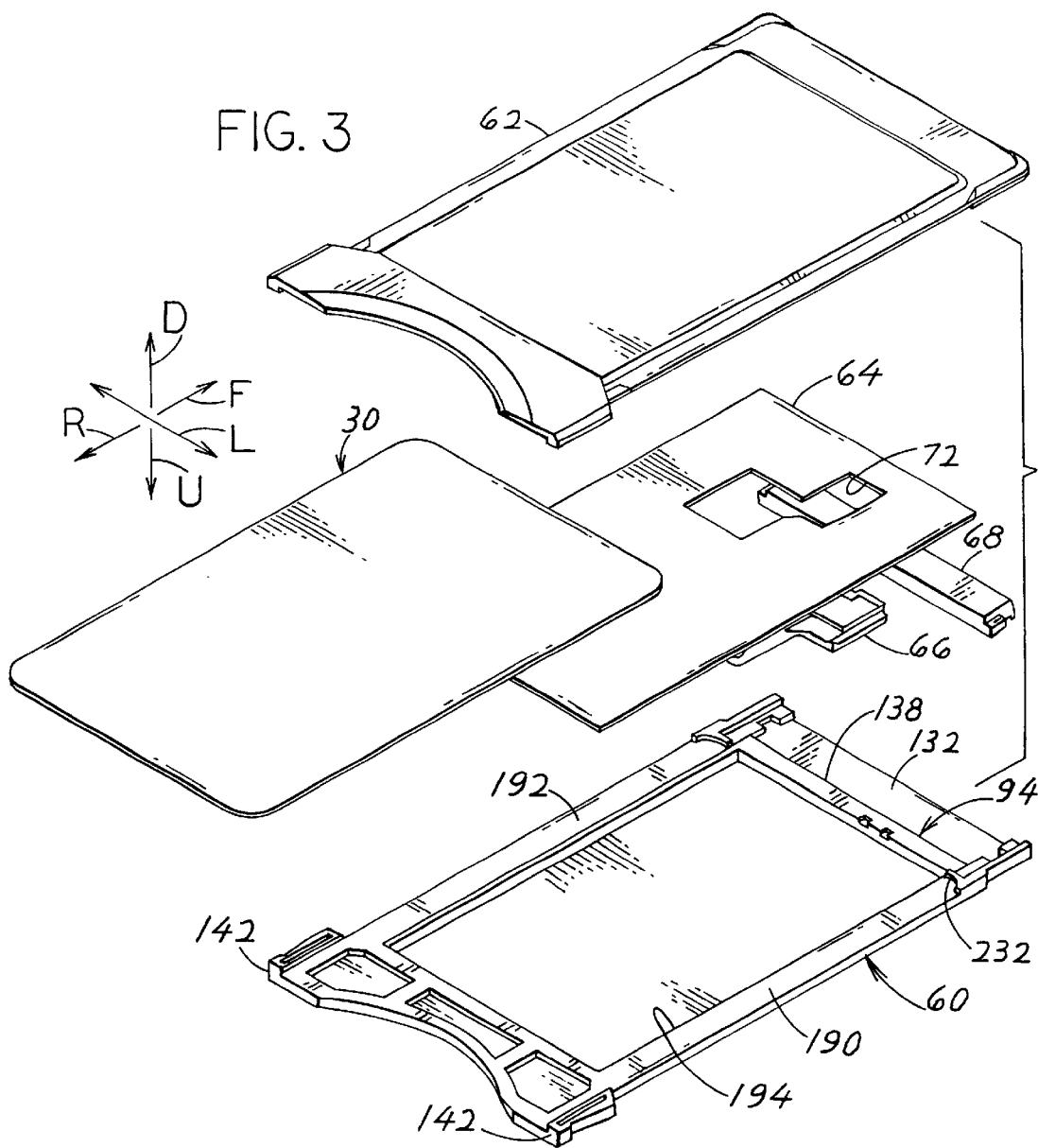
FIG. 3 is an exploded bottom and front isometric view of the adaptor of FIG. 2, showing the adaptor parts upside-down from the position of FIG. 2.

FIG. 1 illustrates an adaptor 10 of the present invention which is designed to be inserted in a forward direction F into a passage 12 of a computer device 14 until contacts 16 at the front of the adaptor engage corresponding contacts 18 at the front end of the passage. The adaptor has an adaptor slot 20 centered on a longitudinal adaptor axis 22, which is designed to receive smart cards such as shown at 30 in FIG. 2. The smart card is inserted in a forward direction F into the adaptor slot 20 to position 30x (FIG. 1) until pad-engaging contacts 32 of the adaptor engage surface pads 34 on the smart card. The pad-engaging contacts 32 of the adaptor are coupled to the contacts 16 at the front end of the adaptor, although the adaptor can include processing circuitry such as filtering circuits etc. The adaptor includes a main portion 40 and a rear extension 50. The main portion 40 has a width A of 54 mm, which is the standard width of a PCMCIA IC card for insertion in a standard passage 12 of a computer device. The smart card 30 has a width B which is also 54 mm according to ISO standards. As a result, the adaptor main part 40 has openings 42 forming the opposite sides of the slot. The rear extension 50 has a greater width than the main part 40 of width A, with the extension having a width such as 60 mm to provide opposite side guide walls 52, 54. The extension has a forwardly-extending recess 56 at its middle, to enable a person to grasp the rear of a fully installed smart card 30x, to pull it out of the adaptor.

FIG. 2 illustrates the parts of the adaptor 10, showing that it includes top and bottom frame halves 60, 62, a circuit board 64 that lies between the frame halves, a smart card connector portion or connector 66, and a front connector 68. The smart card connector 66 has the pad-engaging contacts 32 that engage the surface pads 34 on the smart card. The particular card connector 66 is shown as a part mounted to the circuit board 64, with its contacts 32 projecting through a hole 72 in the circuit board to engage the smart card which lies below the circuit board. The front connector 68 has front contacts 16 that engage contacts of the computer device. The contacts 16 have tails 76 that engage traces 78 on the circuit board to couple to the pad-engaging contact 70, either directly or through signal-processing circuit components 80 on the circuit board.

As shown in FIGS. 4 and 5, the bottom frame half 62 includes a bottom molded plastic body 90 and a bottom sheet metal cover part 92. Similarly, the top frame half 60 includes a top molded plastic body 94 and a top sheet metal cover part 96. The bottom cover part 92 is formed of stainless steel of 0.2 mm thickness, which is bent to the configuration shown, with entrapment parts or tabs 100 anchoring the sheet metal to the plastic body. Similarly, the top sheet metal cover portion 96 is bent to the configuration shown, and has entrapable parts or tabs 102 that are molded to the top plastic body 94 to fix them together. The sheet metal cover parts provide EMI (electromagentic interference) shielding, and provides a scratch-resistant outer surface.

The circuit board 64 is mounted on the top plastic body 94, at laterally opposite sides of the body. Opposite side portion of the circuit board lie on shelves 104 formed by recesses. The lower surface 106 of the circuit board preferably lies at or slightly above the top of the adaptor slot 20. The top and bottom frame halves have facing surfaces 110, 112 at laterally L opposite sides of the adaptor, to guide the smart card 30 in forward and rearward directions. It is noted that the thickness C of the adaptor slot is about 1 mm, with a clearance E of about 0.2 mm between the top of the smart card and the top frame surface 110. The smart card is generally pushed downward against the lower frame surface 112, especially against the lower plastic body surface 114 near the lateral middle of the slot, primarily due to the downward force of the pad-engaging contacts 32 of the card connector in the adaptor.

While the front portion of the smart card may not be laterally confined by the adaptor, the rear of the smart card is confined by the extension 50 shown in FIG. 1, which has the side guide walls 52, 54.

The adaptor is assembled by installing the card connector 66 (FIG. 2) on the circuit board, with tails on the pad-engaging contacts 32 soldered to circuit board traces 120 and with the front connector 68 installed with its lugs 122 received in lug-receiving slots 124 at opposite sides of the front ends 130, 132 of the bottom and top frame halves. The front ends 130, 132 of the frame halves lie forward of the front end 134 of the slot, with the frame halves forming front stops that limit forward movement of the smart card to its fully installed position wherein the card leading edge lies at the front stops. Then, the top and bottom frame halves are permanently fixed together.

The top and bottom frame halves are permanently fixed together by sonically (usually ultrasonically) welding them together. Such welding together occurs at the front ends 136, 138 of the bottom and top plastic bodies, and at rear end parts 140, 142 of the plastic bodies, which lie on laterally opposite sides of the rear extension 50. FIGS. 6 and 7 show details of one side of the front end 138 of the top frame half 60, and of the front end 136 of the bottom frame half 62. The bottom frame half has a base portion 150 lying in a first plane 152. The top half has a base portion 154 lying in the first plane 152 when the bottom and top halves are pressed together. With the bottom and top halves pressed together, ultrasonic energy is passed between them to ultrasonically weld the base portions 150, 154 together. Welding also can occur at mid portions 155, 156 of the body front ends. It is noted that each frame half is symmetrical about a vertical plane extending through the adaptor longitudinal axis (except possibly for small keys at opposite edges of the front end of the adaptor). Welding of the bodies occurs at the front ends 136, 138 of the bottom and top plastic bodies. In addition, the bottom plastic body has an upward projection 160 that lies in a top body recess 162, where ultrasonic welding also occurs, including at side surfaces 164 of the projection and recess. The projection and recess also help to align the bodies when they are to be welded.

Figure 3A:
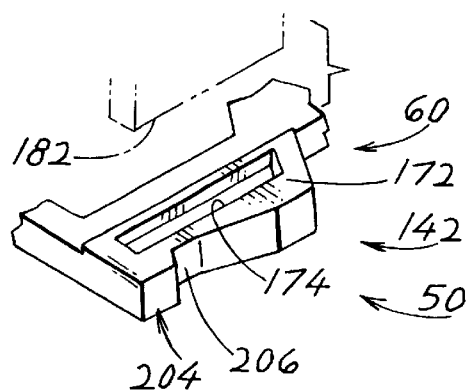
FIG. 3A is an enlarged view of a portion of the top frame half of the adaptor of FIG. 3.

FIG. 3A shows that each top side rear part 142 has a base surface 172 with a recess therein 174. The side rear part of the bottom plastic body is shown in FIG. 2 at 140 as having a projection 182 that fits in the recess shown at 174 in FIG. 3A, and having a base surface that is welded to the base surface 172. Thus, the plastic bodies are welded together on laterally opposite sides on their front ends (and along the width of their front ends), and at laterally opposite sides of their rear ends at the extension thereof.

It can be seen in FIG. 2, that the bottom plastic body 90 has a honeycomb pattern at its middle portion 180 which lies between its opposite sides at 184. The honeycomb pattern reduces the amount of plastic and lightens the adaptor while still providing good sliding support for the smart card, especially at the middle 114 that lies below the contacts 32. The honeycomb pattern results in plastic beams at 114 and 184 that occupy between 10% and 75% of the area of the plastic body below the adaptor slot. FIG. 3 shows that the top plastic body 94 has opposite side beams 190, 192, and with a hole 194 between the side beams. Circuit components mounted on the top of the circuit board can lie in the hole 194.

FIGS. 4 and 5 show that opposite sides of the adaptor have a reduced height G of 3.3 mm. This allows the sides to fit into the sides of the IC card-receiving passage that can receive Type I or II cards. The bottom plastic body 90 terminates short of the sides, and the bottom sheet metal part 92 extends in a 180° fold at each side, to leave top and bottom parallel horizontal legs 200, 202 that form each side of the lower frame part. It is noted that there is no direct downward force of the smart card 30 against the sides of the slot, since the major downward force is by the pad-engaging contacts of the connector 66, which press against the middle of the smart card where the surface pads 34 lie.

FIG. 3A shows that the plastic bodies have side rear parts such as 142 of the rear extension 50 that each forms a handle 204 with recess 206. The handles 204 can be grasped by a person's fingers to pull the adaptor out of the computer device passage. The plastic handles are a plurality of times thicker than the sheet metal and avoid injury to the person's skin, despite corners at the recess 206. The sheet metal is not present at the handles.

FIG. 8 shows a smart card 30X in a fully installed position in the adaptor 10, with the straight part 210 of the card leading edge abutting front stops 212, 214 on the frame halves. It is also possible to form a front stop on a forward extension of the card connector 66 (FIG. 1). Although the rear end 216 (FIG. 8) of the smart card is guided in a lateral direction L by the side guides walls 52, 54 of the extension 50, most of the length of the card is not laterally guided. It would be possible for the front end of the smart card to shift so the card has the orientation 30A, wherein a side of the card projects from the side of the adaptor. Such projection is limited by the width of the passage in the computer device. However, if the passage width is 56 mm, then the front end of the card can shift by 1 mm to either side, and an even wider passage would allow even more lateral shift. Sufficient shift could result in a pad-engaging contact 70 engaging two adjacent contact pads 34 on the smart card.

Applicant resists sideward shifting of the front end of the smart card by providing side stops at opposite sides of the card front end. FIG. 9 shows that the front end of the card includes rounded corners 220. Standards specify that the corners 220 have a radius 222 of 3 mm. If the straight part 210 of the leading edge were extended and the side 224 of the card were extended, they would meet at a vertex 226. The unoccupied region 230 between the actual rounded corner 220 and the area within the imaginary extensions (that form a "sharp corner"), is used by applicant to hold a side stop. FIG. 10 shows a sidestop 232 lying in the unoccupied region 230 that is unoccupied by the smart card corner area. If the smart card is pushed forward until it abuts a front end stop such as 214, then the adaptor will resist sideward shifting of the front end of the smart card, by reason of the smart card abutting the side stops 232. Also, when the smart card is pushed forward, if it is slightly misaligned, the sidestops 232 will push the smart card into alignment with the adaptor slot to prevent the front end of the smart card from projecting laterally out of the adaptor. The side stop preferably extends by an angle Q of about 60° from the lateral direction and is preferably part of a circle for maximum strength.

While applicant has used terms such as "top" and "bottom" to describe the relative positions of the parts, it should be understood that it is possible to use the adaptor in any orientation with respect to the Earth.

Thus, the invention provides an adaptor which can be installed in a passage of a computer device that is designed to receive IC cards, and which has an adaptor slot for receiving a smart card of the same width as the front portion of the adaptor, where the adaptor is of rigid and attractive construction and more closely controls the lateral position of the smart card. The adaptor includes top and bottom frame halves, that each include a molded plastic body, with the molded plastic bodies welded together at opposite sides (and preferably the middle) of their front ends and at opposite sides of a rear extension of increased width. Sheet metal cover parts extend around the bodies and are molded to the plastic bodies by entrapment parts such as tabs that project into the molded plastic of the bodies. Each body forms an upwardly or downwardly-facing wall of the slot that receives the smart card, with the middle of the plastic bottom wall serving to support the smart card against downward forces of pad-engaging contacts. The front end of the smart card is better positioned by providing side stops that lie in unoccupied spaces lying just beyond rounded corners of the smart card.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. An adaptor which is inserted forwardly into a passage of at least a predetermined width, of a computer device that is designed to receive standard IC cards constructed in accordance with PCMCIA standards, where the adaptor has a rearwardly-opening adaptor slot that is designed to receive a standard smart card made in accordance with ISO standards and that have the same width as the standard IC card, and said adaptor has a smart card connector portion with smart card-engaging contacts for engaging surface pads on the standard smart card, and said adaptor has a front part lying forward of said adaptor slot with said front part having front contacts for engaging contacts of the computer device, and the adaptor has a rear extension with a greater width than said standard smart card, wherein:

said adaptor has top and bottom frame halves;

said top and bottom frame halves each includes a sheet metal cover part having mold entrapable parts and a molded plastic body that is molded to the corresponding sheet metal part and that surrounds said entrapable parts;

a first of said plastic bodies has a slot face that lies facewise adjacent to said adaptor slot at a location opposite said smart card-engaging contacts, and each plastic body has a front end that is welded to the front end of the other plastic body at a location forward of said adaptor slot, and each plastic body has a pair of rear end parts lying on opposite sides of said adaptor slot at said extension and welded to the pair of rear end parts of the other plastic body.

2. The adaptor described in claim 1 wherein:

said molded plastic body of said bottom cover half has a plurality of holes that leave a plurality of integral beams between adjacent ones of said holes, where said beams occupy between 10% and 75% of the area of said plastic body below said adaptor slot.

3. The adaptor described in claim 1 including:

a circuit board lying facewise adjacent to said adaptor slot and mounted on the plastic body of said top frame half;

said molded plastic body of said top frame half is a top body, said top body has laterally opposite side beams that lie at laterally opposite sides of said top frame half and that form walls of said slot and that extend in forward and rearward directions along most of the length of said top body and that form a hole between them occupying substantially the entire area occupied by said circuit board as seen in a plan view.

4. The adaptor described in claim 1 wherein said standard smart card has opposite card sides and a front leading edge that has a straight part and that has a rounded corner, with said rounded corner being rounded to a predetermined radius of curvature to leave an unoccupied region between the rounded corner and an imaginary sharp corner, and wherein:

said adaptor forms a front end stop that limits forward movement of the smart card to a fully installed position;

at least one of said plastic bodies is formed with a side stop that lies in one of said unoccupied regions of a smart card lying in a fully installed position, to resist lateral movement of the front end of the smart card.

5. The adaptor described in claim 1 wherein:

each rear end part of the plastic body of a first of said frame halves has a base portion lying in a horizontal first plane and a projection that projects from said first plane toward the other cover half;

each rear part of the plastic body of the second of said frame halves has a base portion lying in said horizontal first plane and walls forming a recess that receives the projection of the plastic body of the first frame half, with said base portions being welded together and said projection and said recess walls being welded together.

6. The adaptor described in claim 1 wherein:

the rear end parts of said plastic bodies form handles at opposite sides of said adaptor, with said handles having recess to provide better finger grips, with said sheet metal cover parts being spaced from said handles.

7. An adaptor which has a front portion of a maximum width of 54 mm and a rear extension of a maximum width that is a plurality of millimeters greater than 54 mm, said adaptor having a rearwardly opening slot that extends forwardly through said extension and through most of the length of said adaptor front portion for receiving a smart card of a width of 54 mm, and said adaptor front portion having a front end with front contacts and having a connector for coupling smart card contact pads to said contacts, comprising:

top and bottom frame halves, with said bottom frame half having a molded plastic body lying under said slot and forming a bottom slot wall with surfaces for slideably engaging the lower surface of said smart card during its sliding into said slot, and with said top frame half having a molded plastic body lying over said slot and forming a top slot wall with surfaces for guiding the upper surface of said smart card in sliding into said slot;

said top and bottom plastic bodies having front body ends at said adaptor front end with said front body ends lying forward of said slot, and said top and bottom body halves having rear body ends at said adaptor rear extension, with said rear body ends having side parts lying on opposite sides of said slot;

said body front ends of said top and bottom bodies are sonically welded together, and each of said body rear end side parts of said top and bottom bodies are sonically welded together;

said top and bottom frame halves each includes a sheet metal cover covering substantially the entire outer surface of the corresponding plastic body and having entrapable parts molded into the corresponding plastic body.

8. The adaptor described in claim 7 wherein:

said bottom plastic body has a smaller width than said top plastic body along a portion of said slot, and the sheet metal cover of said lower frame half has a folded sheet metal part at opposite sides of said lower plastic body where said folded sheet metal part has horizontal top and bottom legs with said top leg forming a lower surface of said slot.

9. The adaptor described in claim 7 wherein:

said bottom plastic body is of honeycomb shape, with a plurality of vertical through holes and with beams formed between the holes, and with said bottom frame part having a sheet metal cover that covers the bottoms of said holes.

10. An adaptor which has a front portion of a maximum width of 54 mm and a rear extension of a maximum width that is a plurality of millimeters greater than 54 mm, said adaptor having a rearwardly opening slot that extends forwardly through said extension and through most of the length of said adaptor front portion for receiving a smart card of a width of 54 mm, and said adaptor front portion having a front end with front contacts and having a connector for coupling smart card contact pads to said contacts, comprising:

top and bottom frame halves, with said bottom frame half having a molded plastic body lying under said slot and forming a bottom slot wall with surfaces for slideably engaging the lower surface of said smart card during sliding into said slot, and with said top frame half having a molded plastic body lying over said slot and forming a top slot wall with surfaces for guiding the upper surface of said smart card in sliding into said slot;

said top and bottom plastic bodies having front body ends at said adaptor front end with said front body ends lying forward of said slot, and said top and bottom body halves having rear body ends at said adaptor rear extension, with said rear body ends having side parts lying on opposite sides of said slot;

said body front ends of said top and bottom bodies are sonically welded together, and each of said body rear end side parts of said top and bottom bodies are sonically welded together;

a circuit board lying between said slot and said top frame half with said connector mounted on said circuit board, with said top plastic body having a pair of recesses forming shelves at opposite sides and with said circuit board having opposite board sides lying in said recesses, with said recesses being vertically at least as tall as the thickness of said circuit board, so said circuit board lies above the smart card and with said top plastic body sides being positioned to engage and guide said smart card during its sliding into and out of said slot.

11. An adaptor which has a rear end and a front portion with a front end, with the front portion having a predetermined maximum lateral width, and said adaptor has a rearwardly-opening slot at said rear end for receiving a smart card that is pushed forward to a fully installed card position at which a leading edge of the card lies rearward of said adaptor front end, where said smart card has straight side edges that are laterally spaced by substantially the same lateral width as said adaptor front portion and said adaptor front portion is devoid of side walls at opposite sides of said slot, and said smart card leading edge has a straight main part and has laterally opposite sides with a rounded corner that leaves an unoccupied space within an imaginary sharp corner and outside of said rounded corner, wherein:

said adaptor has a side stop that lies in said unoccupied space of a fully installed card, to resist sideward movement of the smart card leading edge;

said side stop having a concave surface that faces the smart card rounded corner and that is substantially circular to provide a stop of high resistance to breakoff.

12. An adaptor which has a rear end and a front portion with a front end, with the front portion having a predetermined maximum lateral width, and said adaptor has a rearwardly-opening slot at said rear end for receiving a smart card that is pushed forward to a fully installed card position at which a leading edge of the card lies rearward of said adaptor front end, where said smart card has straight side edges that are laterally spaced by substantially the same lateral width as said adaptor front portion and said adaptor front portion is devoid of side walls at opposite sides of said slot, and said smart card leading edge has a straight main part and has laterally opposite sides with a rounded corner that leaves an unoccupied space within an imaginary sharp corner and outside of said rounded corner, wherein:
said adaptor has a side stop that lies in said unoccupied space of a fully installed card, to resist sideward movement of the smart card leading edge;
said side stop extends about 60° around the corresponding smart card rounded corner.

* * * * *